United States Patent

[11] 3,615,672

| [72] | Inventor | La Monte D. Pischke |
| | | Newburgh, Ind. |
| [21] | Appl. No. | 733,257 |
| [22] | Filed | May 31, 1968 |
| [45] | Patented | Oct. 26, 1971 |
| [73] | Assignee | General Foods Corporation |
| | | White Plains, N.J. |

[54] METHOD OF PREPARING A COLORED, ARTIFICIALLY SWEETENED BEVERAGE MIX
5 Claims, No Drawings

[52] U.S. Cl....................................................... 99/78,
99/141 A, 99/148 R
[51] Int. Cl........................................................ A23l 1/26
[50] Field of Search............................................. 99/141 A,
148, 78, 28

[56] References Cited

UNITED STATES PATENTS

| 3,320,074 | 5/1967 | Gebhardt..................... | 99/141 |
| 3,325,296 | 5/1967 | Braaten........................ | 99/141 |
| 3,476,571 | 11/1969 | Block et al.................... | 99/78 X |

OTHER REFERENCES

Merory, Food Flavorings, 1960 pages 272 and 274

Primary Examiner—Morris O. Wolk
Assistant Examiner—Stephen B. Davis
Attorney—Le Fever, Quillinan & Hubbard ABSTRACT: Corn syrup solids, an artificial sweetener, and a coloring agent are blended and mixed with water to form a bulking agent solution. The solution is dried to density of 0.05 to 0.3 g./cc. At least 50 percent by weight of the bulking agent is blended with flavoring and opacity agents to form a beverage mix. The bulking agent comprises at least 80 percent by volume of the beverage mix.

METHOD OF PREPARING A COLORED, ARTIFICIALLY SWEETENED BEVERAGE MIX

BACKGROUND

This invention relates to beverage mixes and particularly to dry beverage mixes which are marketed in a crystalline or powdered form. More particularly, this invention relates to such beverage mixes which have been artificially sweetened.

There has been considerable activity in the beverage mix area in the last several years. Efforts have been made to improve many of the different characteristics of the beverages prepared from the mix such as flavor, opacity and organoleptic qualities. In addition, there has been a considerable effort made to improve the appearance of the mix itself in the jar or container. This effort has been directed toward two primary objectives; improved particle appearance and uniformity of appearance.

The work done on particle appearance has been aimed at achieving larger, more uniform particles and has been accomplished primarily by means of agglomeration. While agglomeration has been reasonably successful as a technique for obtaining a particle which initially has a desirable appearance, there is a tendency for the agglomerates to break up and appear dusty in the jar, especially as the product is used by the consumer and the volume of product in the jar is diminished.

The work aimed at achieving uniformity of appearance has been primarily directed toward achieving a uniform distribution of the coloring agent throughout the mix in order to avoid having a speckled product. One method of achieving this result in a beverage mix containing large percentages of sugar has been to plate the sugar crystals with a solution of the coloring agent under carefully controlled conditions, such that only the surface of the crystals soften and the coloring agent is absorbed onto the crystals without causing the crystals to lose their shape. While such a technique is successful, it has the disadvantage of requiring additional processing steps which are costly, time consuming and require rather rigid control in order to avoid melting the sugar.

When attempting to achieve a uniform color in an artificially sweetened beverage mix the difficulties are increased. The techniques of plating sugar crystals which have been successful commercially, have been found unsatisfactory for use with artificially sweetened bulking agents. The wetting and blending of the dried particles significantly changes the density of the bulking agent. The increase in density caused by the wetting makes a previously low-density bulking agent unsatisfactory for use in a beverage mix.

SUMMARY OF THE INVENTION

It has now been discovered that an artificially sweetened beverage mix can be prepared in which the particles have a desirable uniformity of appearance, both as to size and color. The key to the invention is the incorporation into a low-density, artificially sweetened bulking agent, an appropriate coloring agent. The bulking agent is prepared from a mixture of a filler, an artificial sweetener, coloring agents and water. The dried bulking agent consists of uniformly colored and sized particles, and the density of the particles is controlled. It has been found that a beverage mix can be prepared utilizing such a bulking agent wherein the bulking agent comprises only about 50 percent of the weight of the mix, but at least 80 percent of the volume of the mix. The high volumetric ratio of bulking agent to mix imparts a uniformity of appearance to the entire mix.

Because the weight ratio of bulking agent to mix is low, it is possible to prepare a mix in which other desirable ingredients such as opacity agents and organoleptic enhancing gum systems are incorporated, without impairing the uniform appearance of the mix.

The product of this invention minimizes the processing steps in that it is unnecessary to color the particles of the bulking agent after the bulking agent is prepared. Also, it makes possible the preparation of a low-density, artificially sweetened beverage mix, as the low-density bulking agent is not subjected to a wetting action after drying. As indicated, such wetting action tends to drastically increase the density of the bulking agent.

The product of this invention offers the further advantage of being able to control the density of the final product by varying the density of the bulking agent depending upon the weight ratio of bulking agent to mix to be used. It also offers the advantage of uniformity of particle size, and since the particles of the bulking agent are whole particles, as opposed to agglomerates, they have less tendency to break and dust.

DESCRIPTION OF THE PREFERRED EMBODIMENT

There are many references in the art concerning the manufacture of a low-density, artificially sweetened bulking agent and these all have in common a filler component and a sweetening component. The bulking agent of this invention also incorporates a filler and a sweetening agent.

The filler comprises the major portion of the bulking agent, generally at least 90 percent by weight. In order to perform satisfactorily in the beverage mix the filler must be water soluble. It has been found that the use of dextrin as a filler is quite satisfactory. The most convenient form of dextrin for the purposes of this invention is the class commonly known as corn syrup solids.

The dextrin used must be readily soluble in water. Also, when manufacturing a sugar substitute it is desirable to form a clear solution which will yield transparent dry particles that have sufficient reflecting surfaces to give the appearance of a crystalline product. Thus in manufacturing a sugar substitute it has been found that the D.E. (dextrose equivalent) of the dextrin will critically affect the desired properties and a D.E. of 15 to 20 is optimum. As the product of this invention is a colored bulking agent, the clarity of solution is not as critical and it has been determined that a D.E. of greater than five will produce a product with the desired solubility. The upper limit on D.E. will tend to be governed by the method used to dry the bulking agent solution. Thus, if drum drying is used, the upper limit will be about 25 in order to prevent the formation of a product which resembles cotton more than it does sugar crystals.

Any synthetic sweetener can be used in the product of this invention. The sweetener is added to the bulking agent solution prior to drying in order to insure uniform distribution of the sweetener throughout the beverage mix. Examples of synthetic sweeteners which may be used are the soluble salts of saccharin, cyclamate and Hexamic Acid such as sodium cyclamate and sodium saccharin. Mixtures of sweeteners may be used and a preferred combination of sweeteners is 10 parts of sodium cyclamate to one part of sodium saccharin. The amount of sweetener used in the bulking agent will depend upon many factors such as the actual sweetener used, the percent of bulking agent in the final beverage mix and the taste characteristics being developed for a particular beverage mix. The exact level of sweetener to be used will be readily determined for a particular beverage, and will generally range from about 0.2 to 10.0 percent of the bulking agent. When using a blend of about 10 parts of sodium cyclamate to 1.0 parts of sodium saccharin as the sweetener, a preferred level of sweetener in the final bulking agent is about 2.0 to 7.0 percent.

The key to the invention is the incorporation of small amounts of a coloring agent in the bulking agent solution prior to drying. By adding the coloring agent prior to drying, all of the particles of the bulking agent are completely and uniformly colored and as the bulking agent comprises about 80–95 percent of the volume of the final beverage mix, a uniformly colored beverage mix is attained. All coloring agents which are normally used in beverage mixes can be used in the product of this invention. The exact amount of coloring agent used will vary, depending on the agent itself, the clarity of the bulking agent solution prior to drying and the intensity of color desired in the finished product. Generally, the coloring agent should be present at a level of 0.02 to 0.20 percent by weight of the dry bulking agent.

Water is an essential ingredient of the bulking agent solution. The percentage of water will be varied in order to obtain a dry product with a desired density. Depending upon the particular beverage mix to be prepared, the density of the dry bulking agent will be varied generally with a range of from 0.05 to 0.30 g./cc. The amount of water used to obtain a dry bulking agent of a specific density will vary greatly depending upon the drying process used. Thus in example 1 it will be seen that the bulking agent solution is about 52 percent water when preparing a bulking agent with a density of about 0.10 g./cc. by spray drying. In example 2 it will be seen that a bulking agent with about the same density is achieved when a solution with about 74 percent water is drum dried.

The drying can be accomplished by any standard, continuous drying technique such as spray drying, drum drying and vacuum drying. A preferred method of drying is spray drying. The equipment used and operating parameters are generally conventional in the spray-drying field as indicated in column 4 of U.S. Pat. No. 3,320,074.

EXAMPLE 1

A colored bulking agent can be prepared using the following ingredients:

|  | % by Weight |
| --- | --- |
| Corn Syrup Solids | 97.20 |
| Sodium Cyclamate | 2.43 |
| Sodium Saccharin | 0.26 |
| FD & C Yellow 05 | 0.035 |
| FD & C Yellow 06 | 0.075 |

About 1.1 parts of water at 140° F. were added per part of the blended ingredients shown and the final solution was then treated and spray dried in accordance with the method shown in U.S. Pat. No. 3,320,074. The resultant product was a bulking agent with a density of about 0.10 g./cc. The particles had a color which was eminently suited for use in an orange-flavored beverage mix.

EXAMPLE 2

A colored bulking agent is prepared by drum drying the following ingredients:

| | |
| --- | --- |
| Dextrin (National Starch Crystal Gum containing trace amounts of dextrose, maltose and triose) | 75.0 g. |
| Water | 250 ml. |
| Sodium Cyclamate | 4.42 g. |
| Sodium Saccharin | 0.44 g. |
| FD & C Yellow 05 | 0.025 g. |
| FD & C Yellow 06 | 0.052 g. |

The above ingredients are blended until a homogeneous solution is obtained. The solution is then dried on a drum drier with the rolls in a pinched position. The drums are heated at a steam pressure of 40 to 60 p.s.i.g. and are rotated at a drum speed of 1 r.p.m.

A colored, crystalline product is obtained with a bulk density of about 0.09 g./cc.

EXAMPLE 3

A water soluble, artificially sweetened, dry beverage mix having an orange flavor and a bulk density of about 0.26 g./cc. is prepared utilizing the bulking agent as prepared by example 1 or 2 or other appropriate means and having a bulk density of about 0.10 g./cc. by blending the following ingredients:

|  | % by Weight |
| --- | --- |
| Bulking Agent | 65.00 |
| Citric Acid | 13.00 |
| Opacity Agent (HVO 110 manufactured by Protein Derivatives according to Pat. No. 3,023,106) | 5.00 |
| Sodium Carboxymethyl Cellulose (low viscosity) | 4.66 |
| Tri Sodium Citrate | 1.89 |
| Orange Oil (Perma Stable Orange Flavor 06007) | 2.21 |
| Five Fold Orange Oil (Perma Stable Orange Flavor 06032) | 1.99 |
| Fries & Fries Art. Flavor 011736 (at 2.0% fix) | 2.91 |
| Fries & Fries Orange Flavor 011169 | 0.57 |
| Firmenich Imit. Orange Flavor 059.427/AP | 1.00 |
| Vitamin C | 1.62 |
| Vitamin A | 0.15 |

The ingredients are dry blended for about 5–10 minutes until a uniform mix is obtained. The resulting beverage mix contains 65 percent by weight of the filler, and 86 percent by volume of the filler. The mix has a desirable uniform appearance of an orange-colored beverage and is readily soluble in water.

It is obvious that other flavored beverage mixes, e.g. orange-pineapple or pineapple-grapefruit, can be readily made by changing the coloring agent in the bulking agent and the flavoring ingredients of the mix. Accordingly, the examples given are for illustrative purposes only and the scope of the invention is to be determined by the scope of the appended claims.

What is claimed is:

1. A method of preparing a low-density, artificially sweetened beverage mix comprising the steps of blending corn syrup solids, an artificial sweetener and a coloring agent, mixing the blended ingredients with water to form a bulking agent solution, drying the bulking agent solution to obtain a bulking agent having a density of from 0.05 to 0.30 g./cc., blending at least 50 percent by weight of the bulking agent with flavoring agents and opacity agents, the bulking agent being at least 80 percent by volume of the final beverage mix.

2. The method of claim 1 wherein the bulking agent solution is spray dried.

3. The method of claim 1 wherein the corn syrup solids has a D.E. of from five to 25 and the bulking agent solution is drum dried.

4. The method of claim 1 wherein the flavoring agents are fruit flavors.

5. The method of claim 1 wherein the coloring agent in said bulking agent is selected to produce a color normally associated with the fruit flavor.

* * * * *